United States Patent
Chang et al.

(10) Patent No.: US 10,597,115 B2
(45) Date of Patent: Mar. 24, 2020

(54) CONTROLLING SYSTEM OF ELECTRIC SCOOTER

(71) Applicant: FUKUTA ELECTRIC & MACHINERY CO., LTD., Taichung (TW)

(72) Inventors: Chin Feng Chang, Taichung (TW); Hung Chun Ke, Changhua County (TW)

(73) Assignee: Fukuta Electric & Machinery Co., Ltd., Taichung (TW)

( * ) Notice: Subject to any disclaimer, the term of this patent is extended or adjusted under 35 U.S.C. 154(b) by 22 days.

(21) Appl. No.: 16/059,736

(22) Filed: Aug. 9, 2018

(65) Prior Publication Data
US 2020/0047847 A1    Feb. 13, 2020

(51) Int. Cl.
*H02K 5/10*    (2006.01)
*B62M 6/45*    (2010.01)

(52) U.S. Cl.
CPC .......... *B62M 6/45* (2013.01); *B62K 2202/00* (2013.01)

(58) Field of Classification Search
CPC .......... H02K 5/10; H02K 11/00; H02K 11/33; H02K 29/08
See application file for complete search history.

(56) References Cited

U.S. PATENT DOCUMENTS 6,031,306 A * 2/2000 Permuy .................. H02K 11/33
                                                    310/60 A
8,860,265 B2 * 10/2014 Galli ........................ H02K 9/18
                                                       310/58

* cited by examiner

*Primary Examiner* — Dang D Le
(74) *Attorney, Agent, or Firm* — Wang Law Firm, Inc.

(57) ABSTRACT

A controlling system of an electric scooter includes a case having a mounting room therein; and a circuit board received in the mounting room of the case, and having a recess portion at an edge thereof. A driving shaft of an electric motor has at least a section in the mounting room of the case and received in the recess portion of the circuit board. It may reduce a size of the case.

3 Claims, 5 Drawing Sheets

US 10,597,115 B2

CONTROLLING SYSTEM OF ELECTRIC SCOOTER

BACKGROUND OF THE INVENTION

1. Technical Field

The present invention relates to an electric scooter, and more particularly to a controlling system of an electric scooter.

2. Description of Related Art

A conventional electric scooter is driven by an electric motor, and a gearbox is provided to transmit the power of the motor to the wheels. Typically, a controlling system is provided to control the running of the electric motor.

In a conventional electric scooter, the electric motor is mounted in a case, and the controlling system has a circuit board mounted in a box. The case and the box are two independent elements, so that a plurality of wires are provided to electrically connect the circuit board in the box to the electric motor in the case.

Since the case and the box are two independent elements, they need a large space in the electric scooter to receive them. Some improved electric scooters provide the circuit board in the case. However, the case has to receive the rectangular circuit board therein, so it does not reduce the space as much as expected.

BRIEF SUMMARY OF THE INVENTION

In view of the above, the primary objective of the present invention is to provide a controlling system of an electric scooter, which takes a space smaller than the prior art.

A secondary objective of the present invention is to provide a controlling system of an electric scooter, which integrates a circuit board in a case beside a driving axle of an electric motor to reduce the size of the case.

A third objective of the present invention is to provide a lubrication system of a power assembly of an electric scooter, which provides a heat dissipating room beside the circuit board to enhance the effect of heat dissipation.

In order to achieve the objective of the present invention, a controlling system of an electric scooter includes a case having a mounting room therein, and a circuit board received in the mounting room of the case and having a recess portion at an edge thereof. A driving shaft of an electric motor has at least a section in the mounting room of the case and received in the recess portion of the circuit board, and the circuit board is electrically connected to the electric motor.

Therefore, the circuit board is closer to the driving shaft because of the recess portion to reduce a size of the case.

In an embodiment, the case further has a heat dissipating room on an opposite side of the mounting room to dissipate a heat of the circuit board.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
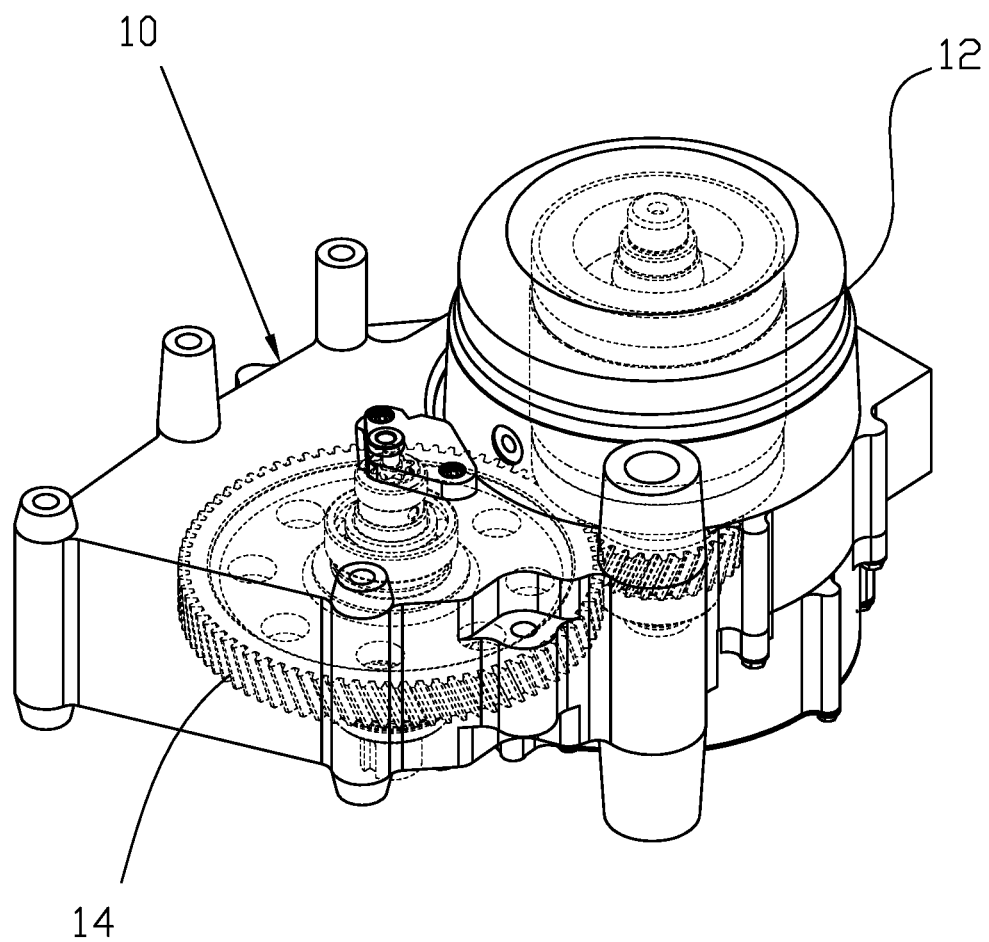
FIG. 1 is a perspective view of a preferred embodiment of the present invention.

As shown in FIG. 1, a power assembly of an electric scooter includes a case 10, in which an electric motor 12 and a driven gear 14 are received. A controlling system of the preferred embodiment of the present invention is connected to the case 10 and electrically connected to the electric motor 12 to control a running of the electric motor 12.

Figure 2:
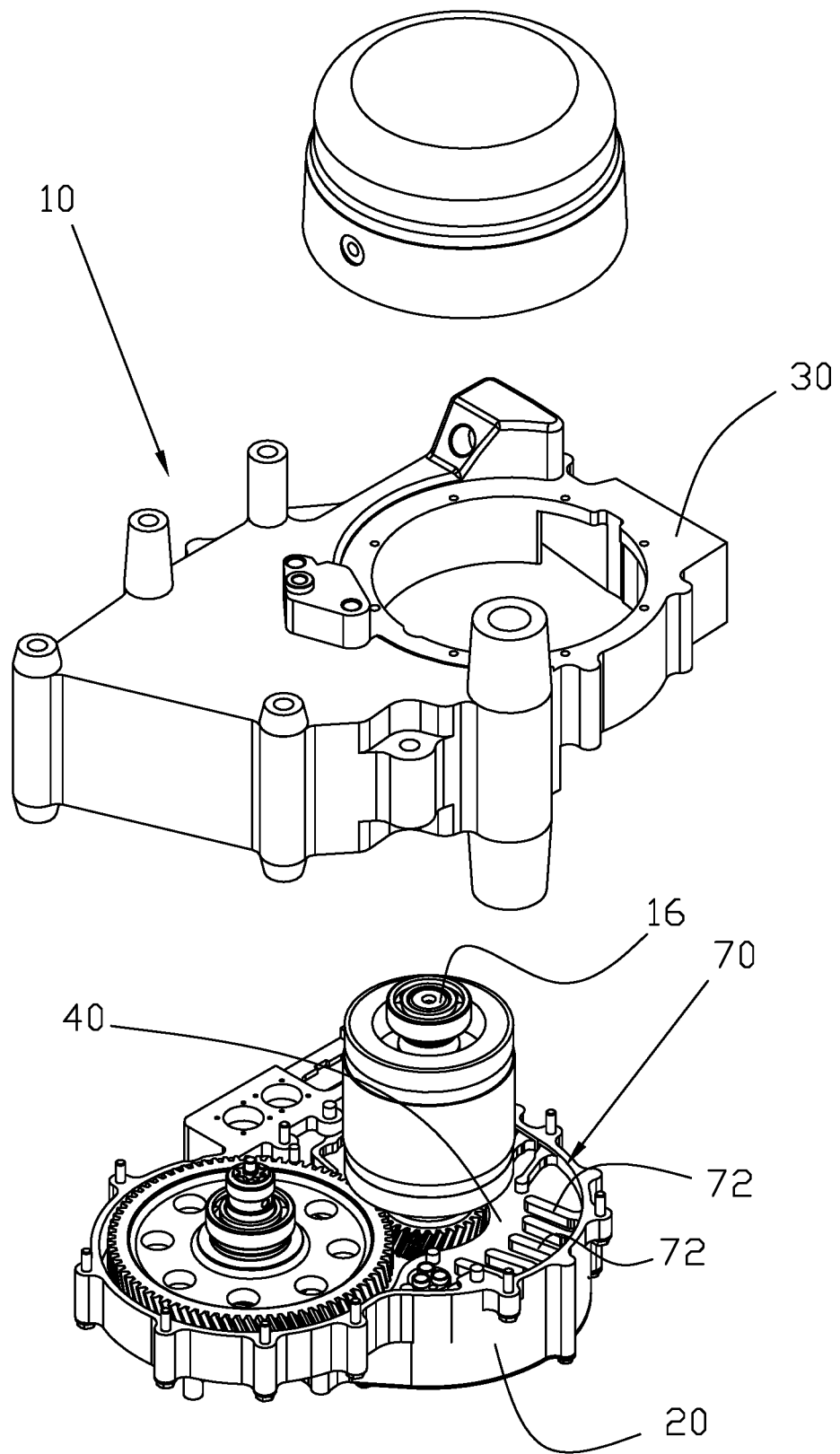
FIG. 2 is an exploded view of the preferred embodiment of the present invention, showing the electric motor and the driven gear.
Figure 3:
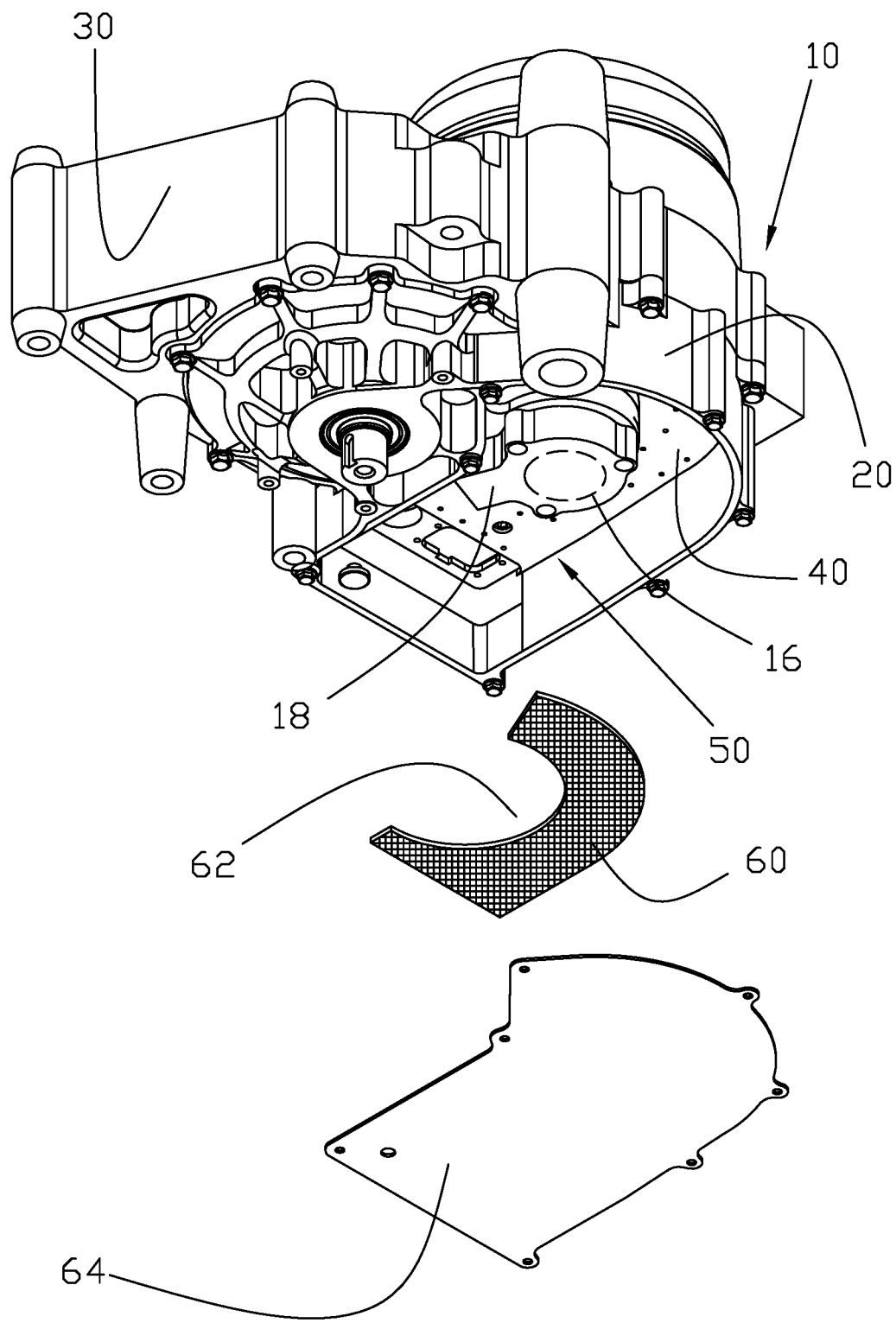
FIG. 3 is an exploded view of the preferred embodiment of the present invention, showing the circuit board.

As shown in FIG. 2 and FIG. 3, the case 10 has a base 20 and a connecting base 30 connected to the base 20. The base 20 has a separating member 40 to divide a space into a heat dissipating room 70 and a mounting room 50. The electric motor 12 and the driven gear 14 are mounted in the heat dissipating room 70, and the electric motor has a driving shaft 16 passing through the separating layer 40 and is received in the mounting room 50. A cover 18 is connected to the separating layer 40 to cover the driving shaft in the mounting room 50.

Figure 4:
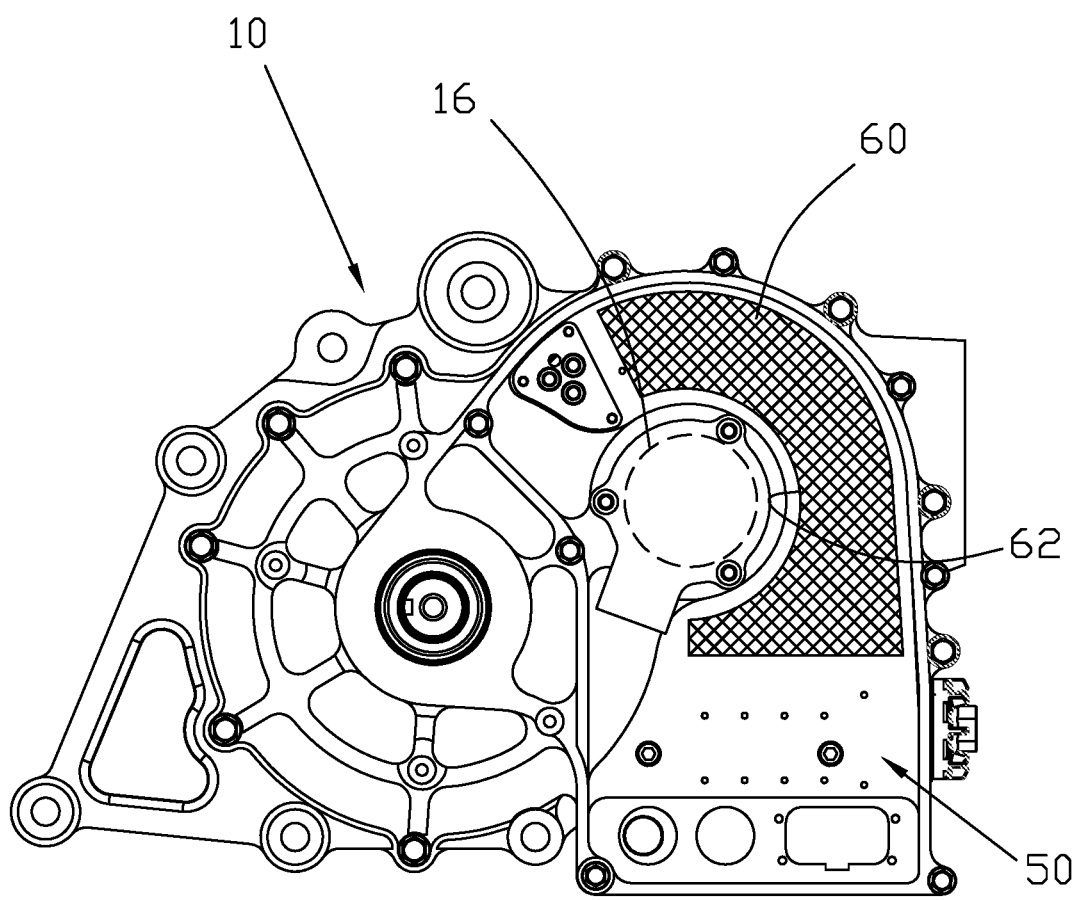
FIG. 4 is a bottom view of the preferred embodiment of the present invention.

As shown in FIG. 3 and FIG. 4, the controlling system includes a circuit board 60, which has a recess portion 62 at an edge thereof. The circuit board 60 is received in the mounting room 50, and the driving shaft 16 of the electric motor 12 in the mounting room 50 is received in the recess portion 62. The circuit board 60 is electrically connected to the electric motor 12. A lid 64 is connected to the base 20 to seal the mounting room 50, and cover the driving shaft 16 and the circuit board 60.

The circuit board 60 is closer to the driving shaft 16 because of the recess portion 62. It reduces the space for the driving shaft 16 and the circuit board 60 to decrease a size of the case 10. Furthermore, the heat dissipating room 70 is filled with a lubricant L, which is helpful to heat dissipation.

Figure 5:
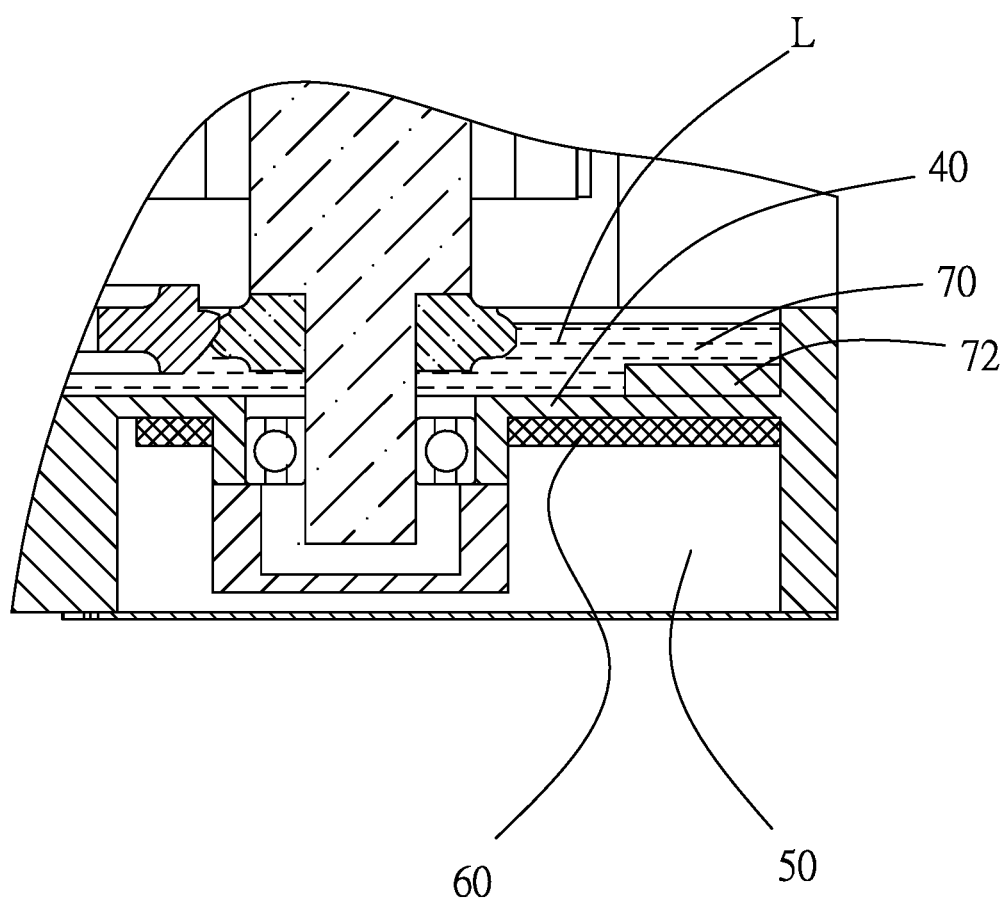
FIG. 5 is a partial sectional view of the preferred embodiment of the present invention, showing the circuit board and the driving shaft.

As shown in FIG. 5, the circuit board 60 is received in the mounting room 50 and attached to the separating layer 60. Heat of the circuit board 60 is transferred to the separating layer 60, and dissipated to the heat dissipating room 70 at an opposite side of the separating layer 60.

As shown in FIG. 2 and FIG. 5, the base 20 is provided with a plurality of ribs 72 in the heat dissipating room 70, which may eliminate bubbles in lubricant L. In addition, the ribs 72 are provided on the separating layer 40, which increases a surface area to help the effect of heat dissipation.

In conclusion, the controlling system includes the circuit board and the heat dissipating structure. A specified shape of the circuit make the circuit board closer to the driving shaft of the electric motor to reduce a size of the case. The circuit board is attached to the separating layer to transfer the heat of the circuit board via the separating layer and dissipate in the heat dissipating room. Furthermore, the heat dissipating room is filled with lubricant for lubricity of the electric motor and the driven gear, and the lubricant is helpful to the heat dissipation without further devices.

It must be pointed out that the embodiments described above are only some preferred embodiments of the present invention. All equivalent structures which employ the concepts disclosed in this specification and the appended claims should fall within the scope of the present invention.

What is claimed is:

1. A controlling system of an electric scooter, comprising:
a case having a mounting room therein; and
a circuit board received in the mounting room of the case, and having a recess portion at an edge thereof;
wherein a driving shaft of an electric motor has at least a section in the mounting room of the case and received in the recess portion of the circuit board, and the circuit board is electrically connected to the electric motor;
wherein the case has a separating layer to divide a space in the case into the mounting room and a heat dissipating room;
wherein the circuit board is attached to the separating layer to transfer a heat of the circuit board to the heat dissipating room via the separating layer;
wherein the heat dissipating room is filled with a lubricant.

2. The controlling system of claim 1, wherein the separating layer is provided with a plurality of ribs on a side in the heat dissipating room.

3. The controlling system of claim 1, wherein the case has a base and a connecting base connected to the base; the base has the separating layer; and the electric motor is mounted in the heat dissipating room, and the driving shaft of the electric motor passes through the separating layer to the mounting room.

* * * * *